(12) United States Patent
Young et al.

(10) Patent No.: US 8,781,254 B2
(45) Date of Patent: Jul. 15, 2014

(54) METHOD, AN APPARATUS AND A COMPUTER PROGRAM FOR DATA PROCESSING

(75) Inventors: Stewart Young, Hamburg (DE); Daniel Bystrov, Hamburg (DE); Thomas Netsch, Hamburg (DE); Michael Kaus, Madison, WI (US); Vladimir Pekar, Toronto (CA)

(73) Assignee: Koninklijke Philips N.V., Eindhoven (NL)

( * ) Notice: Subject to any disclaimer, the term of this patent is extended or adjusted under 35 U.S.C. 154(b) by 751 days.

(21) Appl. No.: 12/516,357

(22) PCT Filed: Nov. 26, 2007

(86) PCT No.: PCT/IB2007/054788
§ 371 (c)(1),
(2), (4) Date: May 27, 2009

(87) PCT Pub. No.: WO2008/065598
PCT Pub. Date: Jun. 5, 2008

(65) Prior Publication Data
US 2010/0061632 A1    Mar. 11, 2010

(30) Foreign Application Priority Data
Nov. 28, 2006 (EP) .................................. 06124925

(51) Int. Cl.
*G06K 9/36* (2006.01)
(52) U.S. Cl.
USPC ........... 382/291; 382/103; 382/153; 382/154; 701/514

(58) Field of Classification Search
None
See application file for complete search history.

(56) References Cited

U.S. PATENT DOCUMENTS

| 5,144,685 | A   | * | 9/1992  | Nasar et al. ................... 382/153 |
| 5,581,629 | A   | * | 12/1996 | Hanna et al. .................. 382/103 |
| 5,926,568 | A   |   | 7/1999  | Chaney et al. |
| 6,111,983 | A   |   | 8/2000  | Fenster et al. |
| 7,657,079 | B2  | * | 2/2010  | Lake et al. ..................... 382/154 |
| 2002/0184470 | A1 | | 12/2002 | Weese et al. |

(Continued)

FOREIGN PATENT DOCUMENTS

| WO | 2004051572 A2 | 6/2004 |
| WO | 2005008587 A1 | 1/2005 |
| WO | 2006013499 A1 | 2/2006 |
| WO | 2006085248 A1 | 8/2006 |

OTHER PUBLICATIONS

Colliott, O., et al.; Integration of fuzzy spatial relations in deformable models—Application to brain MRI segmentation; 2006; Pattern Recognition; 39:1401-1414.

(Continued)

*Primary Examiner* — Tsung-Yin Tsai

(57) ABSTRACT

A method of data processing is provided for estimating a position of an object in an image from a position of a reference object in a reference image. The method includes learning the position of the reference object in the reference image and its relation to a set of reference landmarks in the reference image, accessing the image, accessing the relation between the position of the reference object and the set of the reference landmarks, identifying a set of landmarks in the image corresponding to the set of the reference landmarks, and applying the relation to the set of landmarks in the image for estimating the position of the object in the image.

16 Claims, 4 Drawing Sheets

(56) References Cited

U.S. PATENT DOCUMENTS

| | | | |
|---|---|---|---|
| 2004/0001647 A1* | 1/2004 | Lake et al. | 382/291 |
| 2008/0260205 A1* | 10/2008 | Von Berg et al. | 382/103 |
| 2009/0248305 A1* | 10/2009 | Nakano | 701/223 |

OTHER PUBLICATIONS

Davies, R. H., et al.; 3D Statistical Shape Models Using Direct Optimisation of Description Length; 2002; LNCS 2352:3-20.

Ding, F., et al.; Segmentation of 3D CT volume Images Using a Single 2D Atlas; 2005; LNCS 3765:459-468.

McInerney, T., et al.; Deformable Models in Medical Image Analysis: A survey; 1996; Medical Image Analysis; 1(2) 91-108.

Montagnat, J., et al.; Surface Simplex Meshes for 3D Medical Image Segmentation; www.i3s.unice.fr/-johan/publis/ICRA00.ps.gz ; downloaded on Dec. 13, 2005.

Vernard, L., et al.; Fully Automatic Identification of AC and PC Landmarks on Brain MRI Using Scene Analysis; 1997; IEEE Trans. on Medical Imaging; 16(5)610-616.

Young, S., et al.; Automated planning of MRI neuro scans; 2006; Proc. of SPIE; Medical Imaging; vol. 6144; Sec. 2.2, 2.3, Section 4.

* cited by examiner

METHOD, AN APPARATUS AND A COMPUTER PROGRAM FOR DATA PROCESSING

TECHNICAL FIELD

The invention relates to a method of data processing wherein a position of an object in an image is estimated from a position of a reference object in a reference image.

The invention further relates to an apparatus for data processing arranged to estimate a position of an object in an image from a position of a reference object in a reference image.

The invention still further relates to a computer program for data processing wherein a position of an object in an image is estimated from a position of a reference object in a reference image.

BACKGROUND OF THE INVENTION

In contemporary imaging and data processing techniques there has been established a common practice to sub-divide patient groups into respective sets of similar cases, these cases being subjected to similar imaging or data processing and analysis routines. Currently, when imaging or processing an image selected from a particular patient group, an operator manually defines a typical scanning plan or an initial target region for image segmentation, for example.

It is a disadvantage of the current routine that the operator has to repetitively follow substantially the same procedure, thereby interacting with the image under consideration, which is tiresome and makes this procedure less effective.

SUMMARY OF THE INVENTION

It is an object of the invention to provide a method of image processing whereby use is made of the reference images for purposes of improving the workflow of data processing.

To this end the method according to the invention comprises:

learning the position of the reference object in the reference image and its relation to a set of reference landmarks in the reference image;

accessing the image;

accessing the relation between the position of the reference object and the set of reference landmarks;

identifying a set of landmarks in the image, corresponding to the set of reference landmarks;

applying the said relation to the set of landmarks for estimating the position of the object in the image.

In accordance with the technical measure of the invention, the reference image, it being, for example, one or more training cases representative of the case under consideration, with an a-priori determined position of the sought object therein is analyzed yielding not only the position of the reference object in the learning case, but also its relation to a set of reference landmarks. It is noted that a single site or region can also be used for a set of reference landmarks. In the art of imaging it is a common practice to define typical landmarks for scanning. These landmarks may represent anatomical sites expected in all cases of the selected patient group.

Upon an event a spatial relation between the reference object and the set of reference landmarks in the reference image is determined, the image under consideration is accessed and corresponding set of landmarks therein is identified. The set of landmarks in the image under consideration must be of the type of the set of reference landmarks, it being either an anatomical landmark or a coordinate seed.

Finally, the initial position of the sought object in the image under consideration is established based on the identified set of landmarks and the determined relation between the position of the reference object and the set of reference landmarks. The method according to the invention provides an automatic means for initial data processing of an image based on the analyzed reference images, notably one or more training images representative of the case under consideration.

In an embodiment of the method according to the invention, respective positions of the set of reference landmarks and the set of landmarks are estimated during a step of an automated scan planning.

It is established practice to carry out a scan planning procedure prior to a suitable imaging step. When a suitable automated planning procedure is used, the spatial locations of the set of reference landmarks and the set of landmarks are automatically established. A suitable example of the automated scan planning is disclosed in an earlier application WO 2006/013499-A1, where the spatial relationship between the scanning volume and the anatomical structures in the scout image is learned from one or more training examples. Subsequent scout images are then analyzed by fitting anatomical models to enable recognition of the anatomical structures, and plans for the learned scan are proposed based on previous examples. In the current embodiment of the method according to the invention, landmarks, preferably anatomical landmarks, are used to relate learning reference image and the actual image under consideration. Preferably, for the object a scanning volume may be selected. In this case by relating the scout images with each other a fully automated scan planning is enabled. The initial position of the scanning volume in the actual image under consideration is learned from the reference object, it being the reference scanning volume, obtained from the training image.

In an embodiment of the method according to the invention, for the object a model of a target region is selected.

This technical measure is based on the insight that by relating a suitable learning image, for example an image segmented using said model, with the image under consideration, an initial position of the model can automatically be established. The segmentation of anatomical structures in images is important in a wide range of medical applications. Deformable shape models have proven to be a very effective segmentation approach, for example in target definition for radiotherapy planning. This embodiment of the invention provides a means to automate the initial model positioning, avoiding the need for user interaction.

The method according to the invention can also be used to automate the initialization of other segmentation methods in diagnostic images, such as per se known level set methods and front propagation approaches. Such approaches require setting of seed points, or initial boundaries in a similar fashion. Therefore, in this context the term 'object' may also represent one or more seed points, one or more lines, like splines, one or more surfaces, like boundaries, where specific (characteristic) landmark points are known.

The apparatus according to the invention comprises:

a computing means for learning the position of the reference object in the reference image and its relation to a set of reference landmarks in the reference image;

an input for accessing the image;

accessing the relation between the position of the reference object and the set of reference landmarks;

a processing means for identifying a set of landmarks in the image corresponding to the set of reference landmarks;

applying the said relation to the set of landmarks for estimating the position of the object in the image.

The apparatus according to the invention may be implemented as a computer, which is preferably operable in real time with image data acquisition. Further advantageous embodiments of the apparatus according to the invention are given in Claims 6 and 7. The apparatus according to the invention will be discussed in more detail with reference to FIG. 2.

The computer program according to the invention comprises instructions for causing a processor to carry out the following steps:

learning a position of the reference object in the reference image and its relation to a set of reference landmarks in the reference image;

accessing the image;

accessing the relation between the position of the reference object and the set of reference landmarks;

identifying a set of landmarks in the actual image;

applying the said relation to the set of landmarks for estimating the position of the object in the image.

Preferably, the computer program according to the invention further comprises instructions for causing a processor to perform an automated scan planning for estimating respective positions of the set of reference landmarks and the set of landmarks during the said automated scan planning.

More preferably, the computer program according to the invention, further comprises an instruction for segmenting a target based on the position of the object in the image.

BRIEF DESCRIPTION OF THE DRAWINGS

These and other aspects of the invention will be discussed with reference to Figures.

DETAILED DESCRIPTION OF THE EMBODIMENTS

Figure 1:
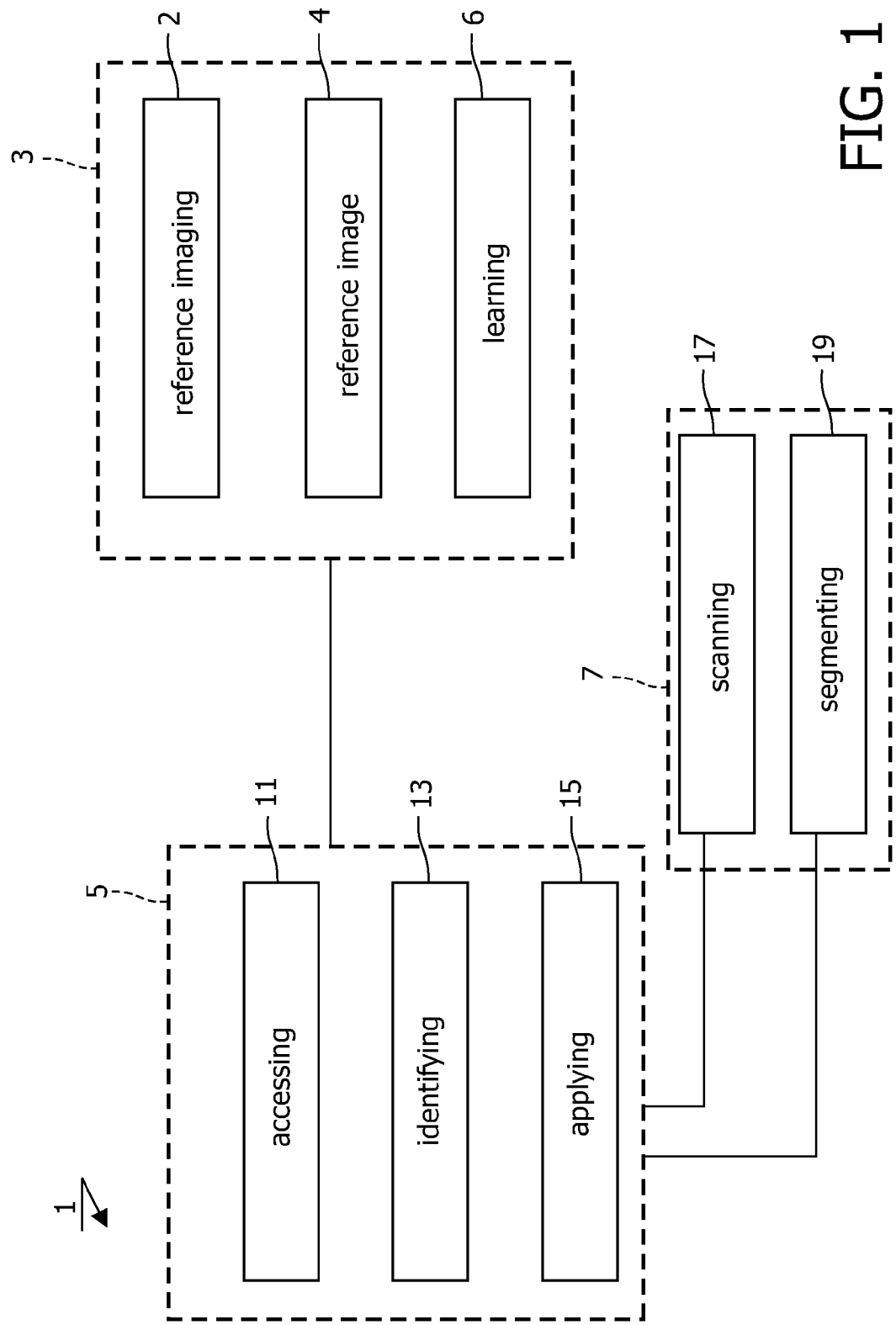
FIG. 1 presents in a schematic way an embodiment of a method according to the invention.

FIG. 1 presents in a schematic way an embodiment of a method according to the invention. The method of the invention may schematically be divided into three stages, stage 3—preparatory, stage 5—processing, stage 7—post-processing. At stage 3 the position of the reference object in the reference image and its relation to a set of reference landmarks in the reference image is established at step 6. In order to enable this, the reference imaging of learning examples may be performed at step 2 and each reference image may be analyzed at step 4, the results may be stored in a suitably arranged database (not shown). It must be noted that the method of learning spatial relationships can also be applied to learn relationships to other objects in the image, for example positions of other structures, relevant to subsequent analysis. In order to process the image under consideration, the image is accessed at step 11, suitable set of landmarks corresponding to the set of reference landmarks in the reference image is identified at step 13 and the spatial relationship established at step 6 is applied to the set of landmarks thereby providing the initial position of the object in the actual image. In case when for the object an imaging volume is selected, the method 1 according to the invention follows to step 7, whereby the scanning 17 is performed within the boundaries given by the thus established scanning volume. In case when for the object a model representative of the target is selected, the method 1 follows to the image segmentation step 19, whereby a suitable segmentation is performed. In case when for the model a deformable model is selected, the segmentation is performed by deforming the model thereby providing spatial boundaries of the target area. A method to segment a structure using deformable model is known per se, from "Deformable models in medical image analysis: A survey" T. McInerney, D. Terzopoulus, Medical Image Analysis, 1(2), 1996, 91-108.

Figure 2:
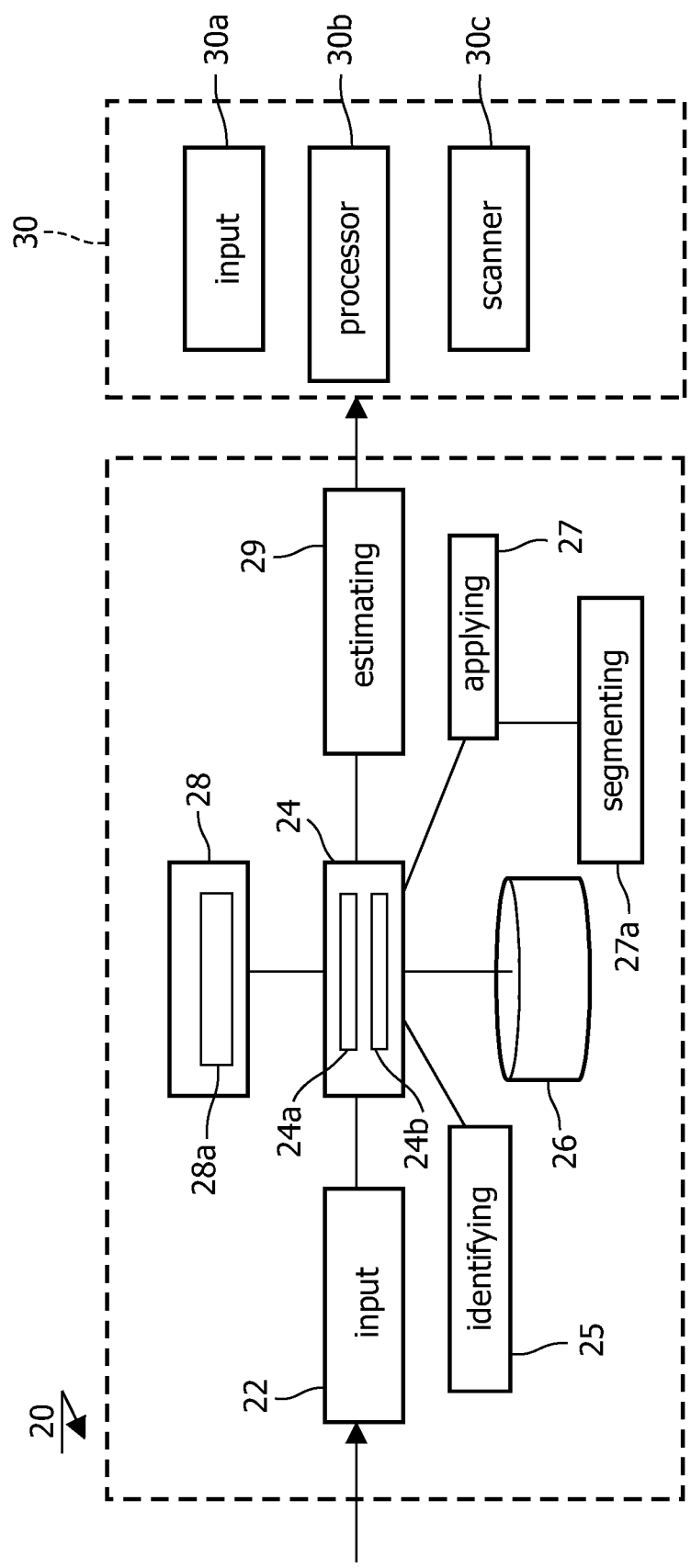
FIG. 2 presents in a schematic way an embodiment of an apparatus according to the invention.

FIG. 2 presents in a schematic way an embodiment of an apparatus according to the invention. The apparatus 20 comprises an input 22 for receiving image data, notably a survey scan of a patient, in any suitable form. For example, the apparatus 20 may be involved in the acquisition of the source image data. In this case the image data may be acquired in an analogue form and converted using a suitable A/D converter to a digital form for further processing. The image data may also be received in a digital form, e.g. through direct acquisition in a digital form or via a computer network after having been acquired by a remote computer/medical instrument. The core of the apparatus 20 is formed by a processor 24 which is arranged to load image data from the input 22 and determine a spatial position of a suitable landmark 24a in the image during an identification step 25. The identification can be performed manually, or, preferably in a fully automated way during a step of automated scan planning. The apparatus 20 further comprises a storage unit 28 arranged to store at least one set of supplementary parameters, namely the position of the reference object in the reference image and its relation to a reference landmark in the reference image 28a. The processor 24 may be arranged to operate a computing means 24b, preferably implemented as a software program, to learn a position of the reference object in the reference image and its relation to the reference landmark in the reference image. It is possible that a set of parameters of the type 28a is pre-stored. The parameters 28a are preferably stored in a suitable database, structured according to a further parameter, like a type of an imaging protocol, a target region, or the like. A suitable example of a storage unit is a background storage, typically based on a hard disk. The apparatus 20 further comprises a working memory 26, typically based on RAM. The storage unit 28 can be used for storing the image data (or parts of it) when not being processed, and for storing operations on the image data and on the default parameters of the imaging geometry. The working memory 26 typically holds the (parts of) image data being processed and the instructions for the suitable image processing means used for processing those parts of the image data. The processor 24 of the apparatus 20 according to the invention is further arranged to apply the relation 28a to the landmark 24a at step 27 thereby estimating the position 29 of the object in the image under consideration.

The apparatus according to the invention preferably further comprises an imaging device 30. In case when for the object a scanning volume is selected, the position of the scanning volume in the image is provided by the processor 24 to the input 30a of the imaging device 30. These data are then forwarded to the processor 30b of the imaging device 30, which initiates the scanner 30c in accordance with the scanning volume. In this way a fully automated scan planning is enabled.

Figure 3:
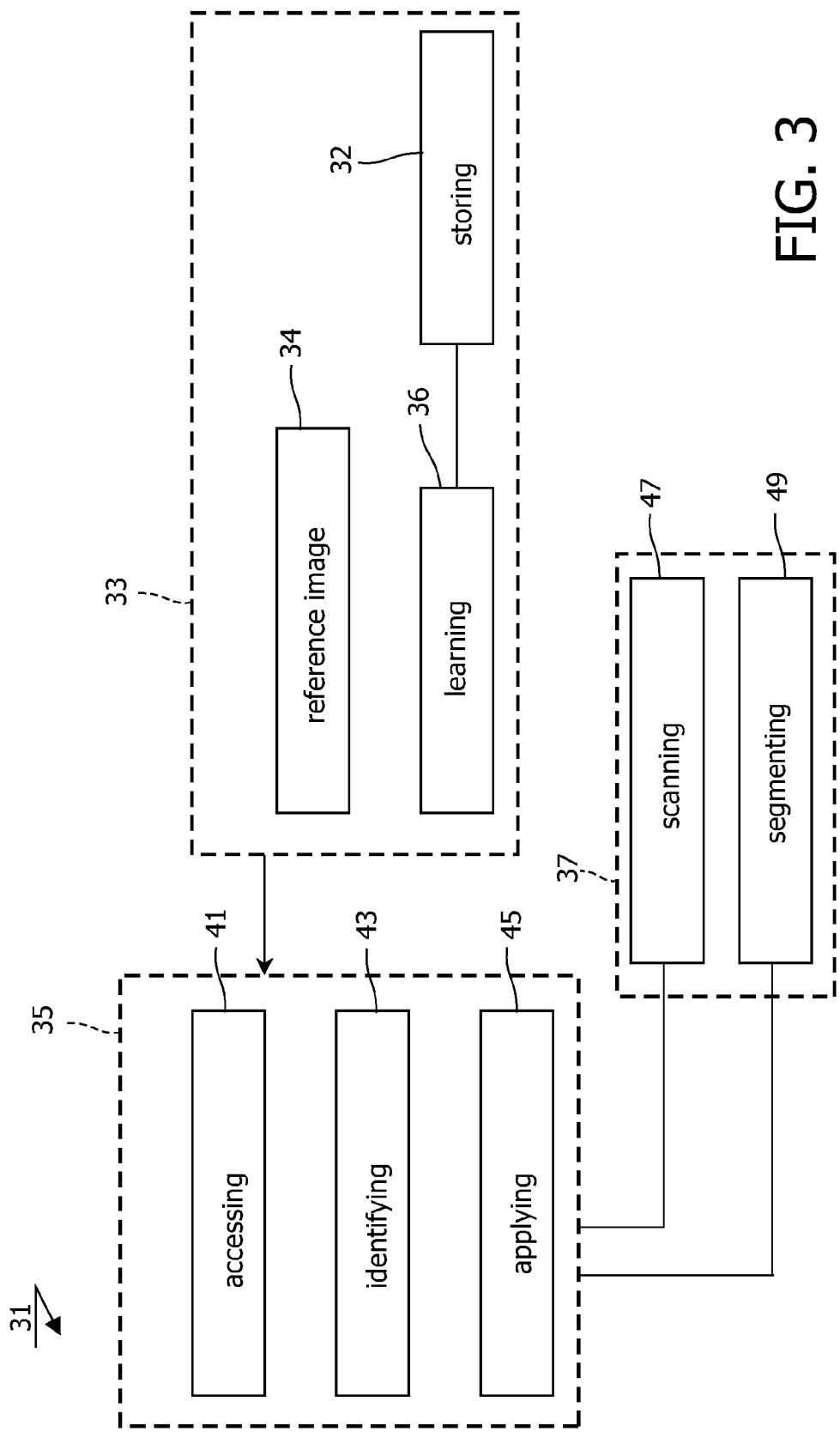
FIG. 3 presents in a schematic way an embodiment of a flow chart of a computer program according to the invention.

FIG. 3 presents in a schematic way an embodiment of a flow chart of a computer program according to the invention.

The computer program 31 of the invention comprises instructions for causing a processor to perform data processing wherein a position of an object in an image is estimated from a position of a reference object in a reference image. The flow-chart of instructions of the computer program 31 may schematically be divided into three stages, stage 33—preparatory, stage 35—processing, stage 37—post-processing. The position of the reference object in the reference image and its relation to a reference landmark in the reference image is established in accordance with instruction 36, the results thereof may be stored in a suitably arranged database 32. In order to enable this, one or more reference images are analyzed following instruction 34. In order to process the image under consideration, the image is accessed following a suitable instruction 41, wherein a suitable landmark is identified following instruction 43. The spatial relationship established for the reference image following instruction 36 is applied to the landmark following instruction 45 thereby providing the initial position of the object in the actual image. In case when for the object an imaging volume is selected, the computer program according to the invention may proceed in accordance with instruction 47, whereby the scanning is performed within the boundaries given by the thus established scanning volume. In case when for the object a model representative of the target is selected, the computer program 31 may follow to the image segmentation step 39, whereby a suitable segmentation of the image data is performed using the thus positioned model. In case when for the model a deformable model is selected, the segmentation is performed by deforming the model thereby providing spatial boundaries of the target area.

Figure 4:
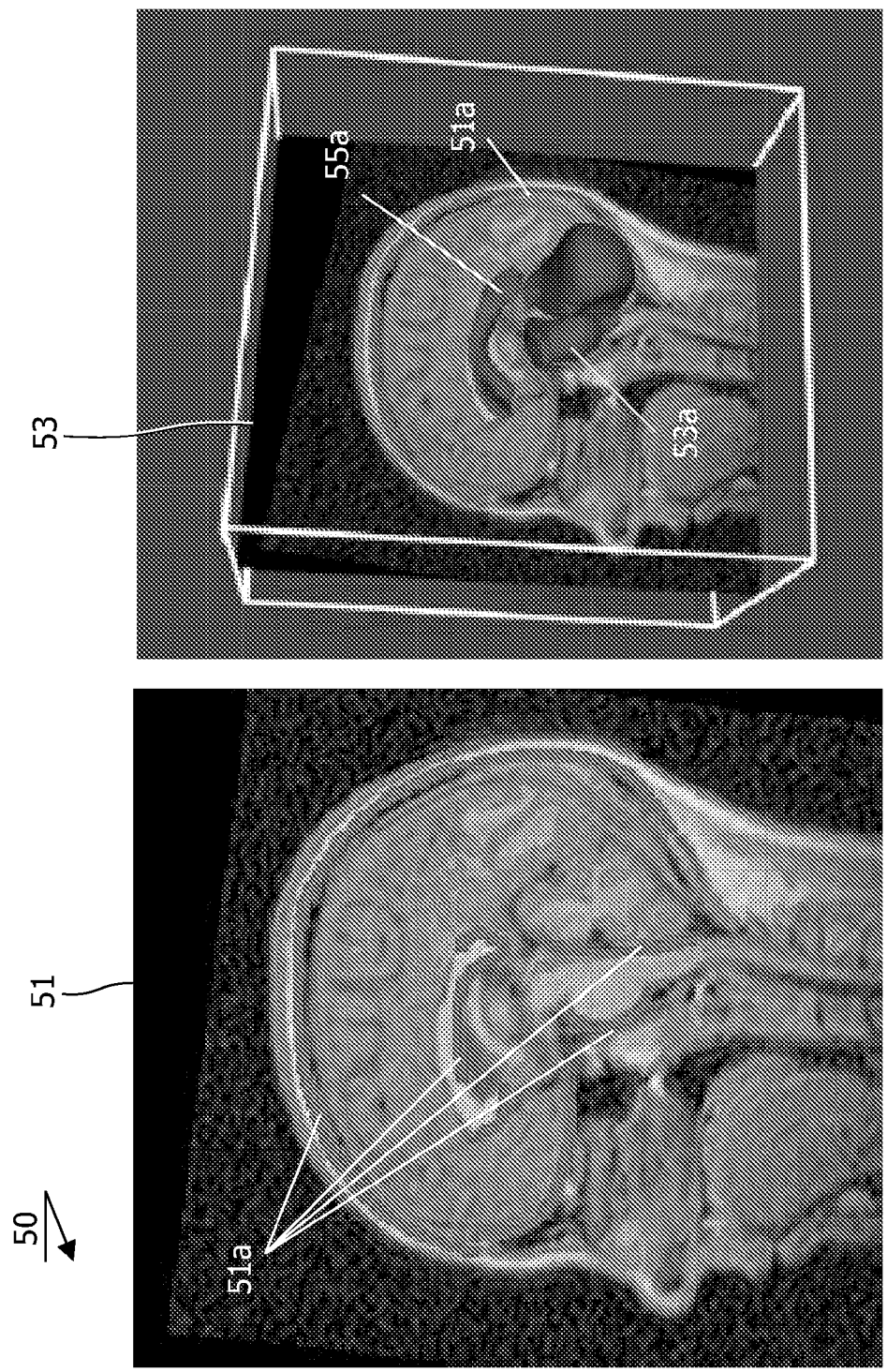
FIG. 4 presents in a schematic way an example of an automated model positioning based on the learning image.

FIG. 4 presents in a schematic way an example of an automated model positioning based on the learning image. The learning image 51 comprises landmarks 51a which are determined for the purpose of the scan planning. These landmarks 51a are used during a post-processing step 53 to position a model, notably a three-dimensional model, 53a, 55a for purposes of image segmentation. Preferably, a deformable model is used, which is subjected to a suitable deformation to establish boundaries of the target region.

The invention claimed is:

1. A method of data processing for estimating a position of a target object in an acquired image from a position of a reference object corresponding to the target object in a reference image, said method comprising:
learning the position of the reference object in the reference image and relation between the position of the reference object and a set of reference landmarks in the reference image using a processor;
storing the learned relation between the position of the reference object and the set of reference landmarks in a storage unit;
receiving the acquired image;
accessing the previously stored relation between the position of the reference object and the set of the reference landmarks;
identifying a set of landmarks in the acquired image corresponding to the set of the reference landmarks in the reference image; and
applying the accessed relation between the position of the reference object and the set of the reference landmarks to the set of landmarks in the acquired image for estimating the position of the target object in the acquired image using the processor.

2. The method according to claim 1, wherein respective positions of the set of reference landmarks and the set of landmarks in the acquired image are estimated during automated scan planning.

3. The method according to claim 1, wherein the target object comprises a model of a target region in the acquired image.

4. The method according to claim 3, wherein the model comprises a deformable model, said method further comprising:
deforming the model for extracting boundary locations of the target region in the image.

5. The method according to claim 1, wherein the target object comprises an imaging volume in the acquired image.

6. The method according to claim 1, wherein the target object comprises at least one seed point in the acquired image.

7. An apparatus for data processing arranged to estimate a position of a target object in an input image from a position of a reference object corresponding to the target object in a reference image, said apparatus comprising:
a computing means for learning the position of the reference object in the reference image and relation between the position of the reference object and a set of reference landmarks in the reference image;
an input for receiving the input image; and
a processor for accessing the relation between the position of the reference object and the set of reference landmarks, identifying a set of landmarks in the input image corresponding to the set of reference landmarks in the reference image, and applying the accessed relation to the set of landmarks in the input image for estimating the position of the target object in the input image.

8. The apparatus according to claim 7, further comprising:
a data acquisition unit operable in a scanning mode, wherein the processor is further arranged to enable an automated scan planning for the said scanning mode, said automated scan planning being based on the position of the reference object in the reference image.

9. The apparatus according to claim 7, wherein the processor is further arranged to perform image segmentation based on the estimated position of the target object in the input image.

10. The apparatus according to claim 7, further comprising:
a storage unit for storing the position of the reference object in the reference image and the relation between the position of the reference object and the set of reference landmarks.

11. The apparatus according to claim 10, wherein the processor retrieves the relation between the position of the reference object and the set of reference landmarks from the storage unit.

12. A computer readable medium storing a computer program, executable by a processor, for data processing wherein a position of a target object in an input image is estimated from a position of a reference object corresponding to the target object in a reference image, said computer readable medium comprising:
learning code for learning the position of the reference object in the reference image and relation between the position of the reference object and a set of reference landmarks in the reference image;
image accessing code for accessing the input image;
relation accessing code for accessing the learned relation between the position of the reference object and the set of reference landmarks;
identifying code for identifying a set of landmarks in the input image corresponding to the set of reference landmarks; and
applying code for applying the accessed relation between the position of the reference object and the set of the reference landmarks to the set of landmarks in the input image for estimating the position of the target object in the input image.

13. The computer readable medium according to claim 12, further comprising:

scan planning code for performing automated scan planning for estimating respective positions of the set of reference landmarks in the reference image and the set of landmarks in the input image during the automated scan planning.

14. The computer readable medium according to claim 13, further comprising:

segmenting code for segmenting a target based on the position of the target object in the input image.

15. The computer readable medium according to claim 12, further comprising:

storing code for causing the learned relation between the position of the reference object and the set of reference landmarks to be stored in a storage unit.

16. The computer readable medium according to claim 15, wherein the relation accessing code accesses the learned relation between the position of the reference object and the set of reference landmarks from the storage unit.

\* \* \* \* \*